(12) United States Patent
Kondo

(10) Patent No.: US 6,730,148 B2
(45) Date of Patent: May 4, 2004

(54) FIRE-PROOF COATING MATERIAL AND FIRE-PROOF CONSTRUCTION

(75) Inventor: Fujio Kondo, Hyogo (JP)

(73) Assignees: Kawaguchi-Mac Industry Co, Ltd, Hyogo (JP); Osaka Oil & Fat Co., Ltd., Amagasaki (JP)

( * ) Notice: Subject to any disclaimer, the term of this patent is extended or adjusted under 35 U.S.C. 154(b) by 0 days.

(21) Appl. No.: 10/208,434

(22) Filed: Jul. 30, 2002

(65) Prior Publication Data

US 2003/0099848 A1 May 29, 2003

(30) Foreign Application Priority Data

Nov. 20, 2001 (JP) ......................................... 2001-354858

(51) Int. Cl.$^7$ .......................... C09K 21/02; C09D 5/18; E04B 1/94
(52) U.S. Cl. .................... 106/18.12; 106/600; 106/626; 106/631; 106/632; 252/601; 428/471
(58) Field of Search ............................... 106/18.12, 626, 106/631, 632; 252/601; 428/471

(56) References Cited

U.S. PATENT DOCUMENTS 4,802,921 A * 2/1989 Motoki ................... 106/18.12
5,034,160 A * 7/1991 Kindt et al. ................. 252/604

FOREIGN PATENT DOCUMENTS

| JP | 53112924 A | * 10/1978 | ........... C04B/19/04 |
| JP | 61120872 A | * 6/1986 | ............ C09D/5/18 |

OTHER PUBLICATIONS

Derwent Abstract No. 2002658727, abstract of Chinese Patent Specification No. 1352337 (Jun. 2002).*

* cited by examiner

Primary Examiner—Anthony J. Green
(74) Attorney, Agent, or Firm—Goodwin Procter LLP

(57) ABSTRACT

An inorganic fire-proof coating material can form a coat film to be transformed into a foamed layer demonstrating quite superior heat insulation ability by uniform foaming as subject to heat, such as that upon fire to prevent softening of the steel material coated by the coat film for a long period to be sufficiently practically applicable as a fire-proofing coat for steel frame structure or the like, and an inorganic fire-proof structure formed by coating the fire-proof coating material. The fire-proof coating material is consisted of an aqueous paste containing water soluble alkaline silicate in a content greater than or equal to 30 Wt % in components excluding water, holmite series mineral powder, and $SiO_2$ supplying components other than water soluble alkaline silicate and holmite series mineral.

9 Claims, 2 Drawing Sheets

FIRE-PROOF COATING MATERIAL AND FIRE-PROOF CONSTRUCTION

BACKGROUND OF THE INVENTION

1. Field of the Invention

The present invention relates to a fire-proof coating material used for a fire-proof coating of steel frame for use in a large size architectural construction, such as a building, and for other purpose, and a fire-proof construction using the coating material.

2. Description of the Related Art

In the recent years, height of building employing a steel frame work is increasing. Associating with this, it has been an important problem to maintain rigidity of a steel frame structure even upon occurrence of fire or the like. In case of ordinary steel, heat-resistance temperature is 350° C., and in case of heat-resisting steel, heat-resistance temperature is merely 600° C. Therefore, the steel frame work may soften at a temperature higher than or equal to the heat resistance temperature. A fire-proof coating demonstrating quite strong heat insulation characteristics is required in order to withstand 1000° C. of temperature at the occurrence of fire. However, asbestos conventionally used as typical fire-proof coating cannot be used for the problem of carcinogenicity due to dust inhalation. Also, for similar concern for health, rock wool cannot be suitable material for fire-proof coating.

As fire-proof material to be a replacement of asbestos or rock wool, various heat-foaming type fire-proof paints forming a heat-insulative foam layer at the occurrence of fire providing flame-proofing and heat-shielding effect, have been proposed. Some of such fire-proof paints already been put into practice. These heat-foaming type fire proof paints includes an inorganic type paint, in which a curing agent, an aggregate component are blended with taking water soluble alkaline silicate as primary component to cause foaming in response to evaporation of moisture content, and an organic type paint blended carbonizer and foaming agent to a binding resin to form carbonized layer in conjunction with foaming by foaming agent. In addition, there have been proposed a paint containing a reaction product of water soluble silicate and alkoxysilane derivative or organosilica sol, as primary component, a paint containing a mixture of water soluble alkaline silicate and ultraviolet curing resin component, and so forth.

However, in the current status, this heat-foaming type first-proof paint has been hardly practiced. Only organic type paint has been put into practice. However, even the organic type paint cannot always be used as constructional fire-proof coating under building standard laws. Furthermore, the organic type heat-foaming type fire-proof paint may maintain the temperature of the steel frame in fire-proofing performance evaluation test lower than or equal to 350° C. only for 40 minutes as shown by correlation curve B of steel temperature-heating period of FIG. 1 and thus is quite precarious as fire-proof coating for steel frame structure. In general, the fire-proofing period of the steel frame required under applicable building standard laws may depend upon height of the building. That is, in fire-proofing performance evaluation test (JIS A1304), when the number of floors of the building as counted from the highest floor is 1 to 4, one hour fire-proofing is required. When the number of floors of the building as counted from the highest floor is 5 to 14, two hour fire-proofing is required. When the number of floors of the building as counted from the highest floor is 15 or more, three hours fire-proofing is required.

Accordingly, in the prior art, even the heat-foaming type fire-proof paint satisfying one hour fire-proofing performance for the steel frame of ordinary steel has not been realized.

During study for realizing inorganic heat-foaming fire-proof paint demonstrating satisfactory heat insulation ability as fire-proof coating for the steel frame work in view of the state of art as set forth above, the inventors have found it particularly important to satisfy the following conditions [A] to [D] as foaming type coat film. Then, cause why the conventional inorganic heat-foaming fire-proofing paint has not being put into practice, is considered as lacking one or more of the following necessary conditions.

[A] To form thick foamed layer with high foaming ability as subject to heat;
[B] To generate uniform and fine bubble over the entire coat film by foaming;
[C] To have high fluidizing point (fluidizing temperature) after foaming; and
[D] To have no crack in the coat film.

In the case of the inorganic paint with water soluble alkaline silicate as primary component, it is required that the coat film may continuously maintain sufficient moisture content for ensuring satisfactory foaming ability. Furthermore, in order to uniformly generate fine bubble over the entire coat film as subject to the heat during fire disaster or other cause and to increase thickness of the entire coat film according to growth of bubble, an inorganic matrix is transformed into molten condition with sufficient viscosity upon evaporation of moisture content in the coat film. If moisture content in the coat film is too high or if viscosity of the inorganic matrix is too low, bubbles may be coupled to form void in the foamed layer or bubbles may be communicated with each other to form continuous bubble condition to lower heat insulation effect. In conjunction therewith, flowability of the foamed coat film is increased to cause dripping of the foamed substance. On the other hand, if the viscosity is too high upon foaming, the coat film can be expanded to cause rupture or can form crack. Also, in further worse case, melting of the coat film becomes insufficient to be broken into small pieces to fly off. Accordingly it is not easy to satisfy the foregoing conditions [A] and [B].

On the other hand, concerning fluidizing point after foaming as the condition [C], when the fluidizing point is low, dripping can be caused in the vertical surface, such as column surface or side surface of the beam can be caused in a short period from foaming to make the foamed layer thinner to significantly lower heat insulation ability in the thinned portion. Furthermore, concerning formation of no crack in the coat film in the condition [D], if crack is present in the coat film, heat and flame may directly reach the steel material at the position where the crack is formed, to instantly elevate the temperature of the steel material. Crack can be formed during curing of the coat film after application and may also formed due to expansion and contraction of the steel material associating to diurnal variation and seasonal variation of temperature. Therefore, it cannot be simply determine property of coat film necessary for crack prevention.

As a result of subsequent extensive experiments and study, the inventors found that when a particular fibrous mineral powder and other $SiO_2$ providing component are blended in the heat-foaming type fire-proof paint containing water soluble alkaline silicate, suitable moisture content can be maintained in a formed coat film. This provides a surprisingly thick heat insulation layer superior in heat insulation ability without forming internal void or crack when subject to the heat. This superior heat insulation can be maintained with high fluidizing point after foaming, and formation of crack during curing of the coat film is reduced to provide superior fire-proofing performance for the steel material, such as steel frame or the like.

SUMMARY OF THE INVENTION

Accordingly, it is the first object of the present invention to provide an inorganic fire-proof coating material which can form a coat film to be transformed into a foamed layer demonstrating quite superior heat insulation ability by uniform foaming as subject to heat, such as that upon fire to prevent softening of the steel material coated by the coat film for a long enough period to be applicable as a fire-proofing coat for steel frame structure or the like. This invention also provides an inorganic fire-proof structure formed by coating the fire-proof coating material.

The second object of the present invention to provide an inorganic first-proof coating material which can be produced at low cost, facilitates formation of a smooth coat film providing superior external appearance by spray painting, forms the coat film which may not peel off by water-cannon for extinction, may not generate harmful gas or smoke, can be easily removed from a surface of a steel material after foaming, and does not cause a problem of environmental pollution, and an inorganic fire-proof structure formed by coating the fire-proof coating material.

According to one aspect of the present invention, a fire-proof coating material may be an aqueous paste comprises:

a water soluble alkaline silicate having greater than or equal to 30 Wt % solid components excluding water;

a holmite series mineral powder; and $SiO_2$ supplying components other than water soluble alkaline silicate and the holmite series mineral in powder form.

The holmite series mineral may be sepiolite. The holmite series mineral may be blended in a ratio of 5 to 50 Wt % with respect to water soluble alkaline silicate.

The $SiO_2$ supplying component may be blended in a ratio to establish 3.7 to 8 of a molar ratio of $SiO_2/M_2O$ in the coating material wherein M is alkali metal. In the alternative, the $SiO_2$ supplying component may be blended in a ratio to establish 5.0 to 7.0 of a molar ratio of $SiO_2/M_2O$ wherein M is alkali metal in the coating material. The $SiO_2$ supplying component may be at least one selected among hydrolytic mica, calcium silicate, colloidal silica, natural glass, a kaolin, and perlites.

The aqueous paste may further contain titanium oxide powder. Also, the aqueous paste may further contain hydroxypropylene cellulose.

According to another aspect of the present invention, a fire-proof construction includes a steel frame formed with a fire-proof coating material set forth above, on a surface of the steel frame directly or via an undercoat layer.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1:
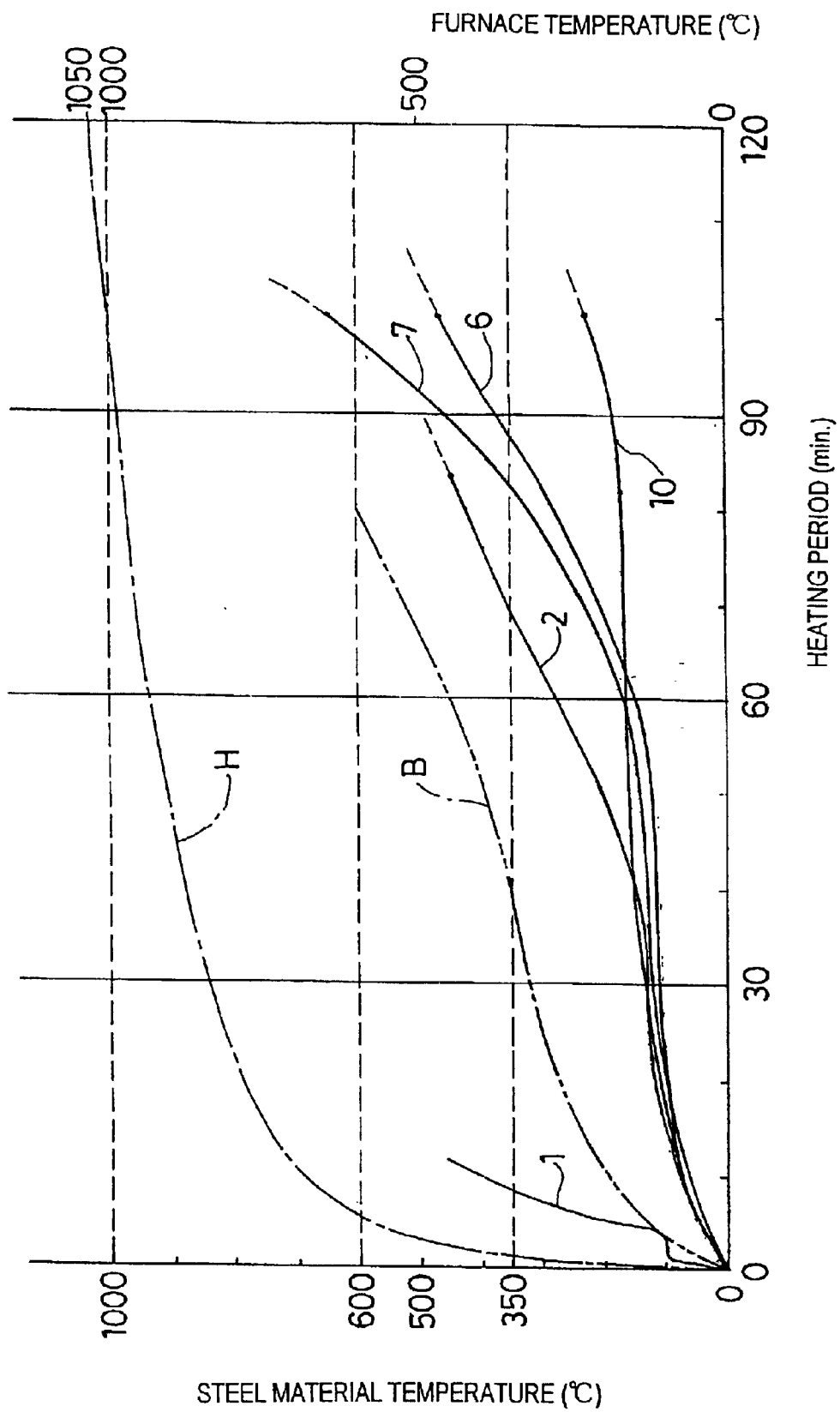
FIG. 1 is a characteristic chart showing a correlation of steel material temperature-heating period in a fire-proof performance evaluation test of steel material provided with a coat film with a fire-proof coating material in an embodiment of the present invention and a comparative example.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure is not shown in detail in order to avoid unnecessary obscurity of the present invention.

A fire-proof coating material according to the present invention is an inorganic heat-foaming type fire-proof paint consisted of an aqueous paste prepared by blending a water soluble alkaline silicate as basic component, a powder of holmite series mineral, and $SiO_2$ supplying component other than the former two components, and forms a heat-foaming type coat film by application on a surface of a steel frame or the like. The coat film causes foaming as subject to heat at the occurrence of fire disaster to form uniform and thick foamed layer. Since the foamed layer demonstrates superior heat insulation ability, fire-proofing performance satisfying one hour fire-proofing defined by Building Standard Law even when the steel frame is ordinary steel can be certainly satisfied. Furthermore, with some blending specification, two hour fire-proofing can be realized. Also, when thicker coat film is formed, three hour fire-proofing is possible.

While a mechanism how the coat film by the fire-proof coating material according to the present invention develops marvelous fire-proofing performance, is not clear, the matrix of the coat film becomes molten condition of ideal viscosity to establish exquisite balance of foaming timing and speed upon foaming as subject to heat, to achieve stable growth of fine bubble over the entire coat film without causing localization resulting in uniform expansion of overall coat film to form the foamed later optimal for heat insulation.

Holmite series mineral taken as essential component in the fire-coating material of the present invention is a mineral having fibrous structure which provides aspiration effect to maintain humidity of the formed coat film constant. Namely, holmite series mineral serves for discharging moisture to atmosphere when moisture content of the coat film becomes too high, and for absorbing moisture from atmosphere when moisture content of the coat film becomes too low. Thus, the coat film may continuously maintain necessary suitable moisture content by foaming. Also, holmite series mineral controls foaming of the coat film as subject to heat upon occurrence of fire disaster to establish exquisite balance of foaming timing and speed upon foaming as subject to heat to contribute for uniform foamed layer superior in heat insulation. Furthermore, with reinforcement effect by fibrous structure, holmite series mineral performs function of effectively preventing occurrence of formation of crack upon curing of the coat film and due to secular change.

Typical holmite series mineral may be, while not limitative, sepiolite as ino-silicate mineral of magnesium.

Then, such sepiolite has suitable fiber length, is available at low cost and thus is particularly preferred. When fiber length is too long, excessive gas is difficult to escape upon foaming of the coat film upon fire disaster to expand the foamed layer like a balloon to easily form void portion therein.

Composition of the powder of holmite series mineral is preferably in a range of 5 to 50 Wt % relative to water soluble alkaline silicate, and is particularly optimal in a range of 5 to 30 Wt %. If composition is too small or too large, balance of foaming timing and foaming speed can be destroyed to cause difficulty in formation of the foamed layer having superior heat insulation ability. Particularly, when the composition is too small, the moisture content in the coat film can be varied due to external environmental condition (atmospheric temperature, humidity and so forth) to lead lowering of heat insulation ability due to lacking of foaming or to lead formation of void due to excessive foaming, and in conjunction therewith to cause difficulty is achieving sufficient effect in viewpoint of preventing of formation of crack of the coat film.

Water soluble alkaline silicate in the fire-proof coating material according to the present invention is a basic component for providing foaming ability for the coat film and retains vaporized contained moisture in a form of bubble by melting as subject to heat upon occurrence of fire disaster to permit transformation of the coat film into the foamed layer. On the other hand, even in the coating material, an aqueous solution thereof serves as a liquid medium for dispersing or dissolving other components. Accordingly, water soluble alkaline silicate is required to present in a composition greater than or equal to 30 Wt % in the composition except for moisture content in the coating material. If the composition of water soluble alkaline silicate is less than 30 Wt %, sufficient foaming ability can be obtained.

As such water soluble alkaline silicate, sodium silicate, potassium silicate and the like may be used. However, it is possible to suitably use a product marketed in a form of aqueous solution as water glass. Thus, water soluble alkaline silicate is expressed by a constitutional formula of $M_2O \cdot nSiO2$ wherein M is an alkali metal). Molar ratio of $M_2O$ and $SiO_2$ is variable depending upon kind of composition and grade of water glass.

However, according to study by the inventors, there is a tendency that the fluidizing point (fluidizing temperature) of the coat film after foaming becomes higher at higher molar ratio of $SiO_2$ to require longer period to drip the coat film down from subjecting to heat upon fire. Therefore, superior heat insulation effect of the foamed layer can be maintained for a long period. For example, the molar ratio of the water glass under JIS-3 is about 3.2. Therefore, ratio of $SiO_2$ cannot be set higher by water soluble alkaline silicate alone. For this reason, the present invention adds other $SiO_2$ supplying component to increasing the ratio of $SiO_2$ and to make the fluidizing point after foaming higher to maintain superior heat insulation effect by the foamed layer for a long period. It should be noted that $SiO_2$ component contained in holmite series mineral has little contribution for elevating and lowering of the fluidizing point.

Such $SiO_2$ supplying component may be selected, while not limitative, among hydrolytic micas, calcium silicate, colloidal silica, natural glass, perlites, kaolines, clay mineral containing $SiO_2$ as primary component, such as siliminate, and calcined thereof, hollow alumino silicate particles and so forth. Two or more of these $SiO_2$ supplying components may be contained together. It is particularly preferred to contain hydrolytic mica as essential component and to additionally contain one selected among calcium silicate, colloidal silica, natural glass, kaolines, perlites.

On the other hand, composition of the $SiO_2$ supplying component is selected to set molar ratio of $SiO_2/M_2O$ (M is alkali metal) at 3.7 to 8 in the composition. Namely, if the molar ratio is too low, fluidizing point after foaming becomes unacceptably low to easily cause dripping off of the foamed layer to cause difficulty in maintaining high heat insulation ability. Conversely, when the molar ratio is excessively high, relative ratio of water soluble alkaline silicate in the coating material is lowered to cause lacking of foaming. If the molar ratio exceeds 8, preparation of the coating material becomes difficult. Thus, upon providing fire-proof performance in far exceeding one hour fire-proof for the steel frame of normal steel, it is recommended to set the molar ratio within a range of 5.0 to 7.0.

Among $SiO_2$ supplying components, hydrolytic micas which is micaceous mineral added moisture, is particularly suitable for a function for improving heat insulation ability by providing secondary foaming ability for the coat film of the coating material. Namely, in the hydrolytic micas, moisture as substitution for alkali component in crude ore, is contained. The moisture contained in hydrolytic micas is present in a form of crystal water in unique layer structure difficult to transmit heat to hardly cause evaporation even as heated. Evaporation and dehydration are initiated when an external temperature reaches about 800 to 1000° C. to be transformed into porous structure by expansion (stripping expansion) in accordion form by expansion between layers of layer structure by steam in dehydration. Accordingly, when the coat film of the fire-proof coating material containing hydrolytic micas is subject to heat of fire, non-crystal water type moisture in the coat film is evaporated associating with melting of water soluble alkaline silicate as primary component to form bubble to prevent elevating of temperature of the coated steel material by heat insulation ability of generated foamed layer. When the foamed layer per se is elevated the temperature due to elevating of temperature by fire, crystal water in hydrolytic micas initiates evaporation to generate secondary foaming to add heat absorption and heat insulation effect associating with secondary foaming to restrict temperature elevation of coated steel material for longer period.

As such hydrolytic micas, while not restricted, various moisture containing mineral belonging white micas or black micas may be used. Amongst, non-calcined Vermiculite called is preferred. Vermiculate is formed by substituting alkali component of augite with moisture by influence of hot water, and calcined product thereof has light weight for porous structure and has been widely used as concrete compounding agent, heat insulating material, acoustical material, soil conditioner and so forth. However, in the present invention, non-calcined Vermiculite is used for leading secondary foaming by crystal water as set forth above. As non-calcined Vermiculate, satisfactory secondary foaming ability cannot achieved for easily transmitting heat to inside of particle in case of fine particle, one having relatively large grain size having average grain size of about 1 to 3 mm is preferred.

Suitable perlite as $SiO_2$ supplying component may be perlite produced as glassy ore as one kind of acidic volcanic rock having high silicate content greater than or equal to 80% as sum of silica ($SiO_2$) and alumina ($Al_2O_3$) and a little amount of alkali component ($Na_2O$, $K_2O$), and containing 2 to 5% of crystal water, or pitchstone containing 5% or more of crystal water. These ore may be used as crushed product of the crude ore or calcined product after crushing.

While colloidal silica is preferred as $SiO_2$ supplying component, since it serves to increase viscosity of paint, it becomes necessary to increase moisture content for ensuring coating ability by spray painting or so forth when composition is increased. When moisture content becomes large, crack can be formed easily during drying and curing. Therefore, when it is required to contain large content of $SiO_2$ supplying component for setting molar ratio high from kind of water soluble alkaline silicate and content ratio of coating material, it is desirable to use $SiO_2$ supplying component other than colloidal silica and having small viscosity increasing function, together with colloidal silica. As $SiO_2$ supplying component having small viscosity increasing function, natural glass produced as volcanic ash is preferred.

In addition to $SiO_2$ supplying component, for presence of calcium and needle or fibrous shape, calcium silicate provides quite high crack preventing function for the coat film in cooperation with holmite series mineral powder. On the other hand, kaolines is clay mineral consisted of one or more kinds of kaolinite, nakulite, Dickite, halloysite and so forth, and metakaoline as calcined is particularly preferred. Hollow alumino silicate particle is follow particle to be effective for further enhance heat insulation effect of coat film. However, since hollow alumino silicate has thermal expansion property, it is not desirable to blend large amount alone.

In the fire-proof coating material according to the present invention, various necessary additives may be blended as required in addition to the water soluble alkaline silicate, holmite series mineral powder, the $SiO_2$ supplying component. As preferred additive, titanium oxide powder, water repellent preparation, adhesion property providing agent and so forth may be used.

Titanium oxide powder may provide coloring function as white pigment, and in addition provide a function as fungicide of coat film and for preventing dripping in molten condition in the coating material of the present invention. Therefore, it is preferred to use in a range of about 1 to 15 Wt % relative to water soluble alkaline silicate. As such titanium oxide powder, rutilated one is preferred for superior anti-dripping function.

Water repellent agent is a component for preventing melting out of the coat film into rain water after construction of the steel frame work and until roof, wall and other surrounding portion are formed. As water repellent agent, while not limitative, silicon type water repellent agent, such as hydropolymethyl siloxane and the like is preferred in viewpoint of affinity with other component. On the other hand, the adhesion property providing agent is a component enhancing adhesion ability of the coat film to the steel material to be coated. Particularly, as agent useful for improving adhesion ability under high temperature, hydroxypropylene cellulose is recommended. In addition, to the fire-proof coating material according to the present invention, inorganic chromatic pigment, aggregate, filler, viscosity modifier and various additives may be arbitrarily blended depending upon application.

In order to prepare the coating agent according to the present invention, other components set forth above may be added and mixed to water soluble alkali silicate. The coating material thus prepared is aqueous paste and generally in a form of cream or putty which is applicable for spray painting, brush painting, flow-casting painting through slit, as is. However, it is also possible to thin the coating material with water adapting to painting method as required. Also, in order to form a desired thickness of coat film, recoating can be performed.

The fire-proof coating material according to the present invention thus prepared can satisfy the foregoing essential conditions [A] to [D] for exhibiting high heat insulation performance, and, additionally achieves the following superior characteristics.

(i) Since entire volume has inorganic composition, harmful gas and smoke will never be generated even upon occurrence of fire disaster.

(ii) It demonstrates adhesion ability of the coat film to the surface of the steel material, the coat film is hardly peeled off by water-cannon pressure for extinction.

(iii) Since the coat film after foaming can be easily peeled off the surface of the steel material by beating with hammer or wooden hammer, it may not be hindrance for re-painting after fire disaster.

(iv) The coat film after foaming peeled from the surface of the steel material does not contain harmful substance to raise no environmental problem in disposing.

(v) It can be produced at low cost and easily filled in a container.

(vi) Since spray painting is possible, superior application ability in formation of coat film can be achieved.

(vii) Sedimentation of solid component will never be caused during storage to maintain stable property for a long period to require stirring operation for re-dispersion before application.

(viii) Since the surface of the coat film is smooth to present good external appearance, particular finishing painting becomes unnecessary.

While the coating material according to the present invention is particularly suitable as fire-proof coating of the steel material, such as steel frame, it is also applicable for fire-proof coating of various articles formed of other materials, such as FRP pipe, paper tube and so forth. When fire-proof coating of the steel material is to be formed, a film thickness is preferred to be in a range of about 1 to 20 mm. If the film is too thin, sufficient fire-proofing performance can be obtained. On the other hand, when the film is too thick, it causes increasing of weight of the coated steel material, and may cause dripping by its own weight upon foaming. It should be noted that thickness after foaming is three to four times of the film thickness before foaming.

It should be noted that while the fire-proof coating material according to the present invention shows good adhesion ability to the surface of the steel material, such as steel frame, it is possible to apply the coating material of the present invention over an undercoat layer applied on the surface of the steel material. As the undercoat layer for such application, it is preferred one having a performance as intermediate adhesive layer for improving coating ability for the steel material upon foaming of the coat film by fire-proof coating material of the present invention. Thus, concerning undercoat layer serving as the intermediate adhesive layer, there is no particular constraint as long as enhancing adhesion ability. However, in viewpoint of affinity with the first-proof coating material according to the present invention, it is preferred the inorganic undercoat layer having similar or nearly similar composition to the fire-proof coating material.

thickness. It should be noted that MR in table 1 is the molar ratio of $SiO_2/M_2O$ (M is Na). Each blended component used is as follow:

| | |
|---|---|
| JIS No. 3 Water Glass | Osaka Soda K. K. (Concentration: 38 Wt %, Molar Ratio of $SiO_2/M_2O$: 3.2) |
| Sepiolite Powder | Showa Kobutsu K. K.: Milcon MS-2-2 |
| $SiO_2$ Suppling Component | |
| Vermiculite Particle | Australian Vermiculite Industry Pty. Ltd.: (non-calcined. grain size 1.2 to 2.2 mm |
| Colloidal Silica | Nissei Kyoeki K. K.: Zeoseal 77 (aqueous amorphous $SiO_2$ 98%) |
| Calcium Silicate Powder | Hiclon India Limited: Hicon S-3 |
| Natural Glass Powder | Kyushu Permice K. K.: Permice Kp-F |
| Almino Silicate Particle | Nippon Ferrite K. K.: Ferrite 5e (hollow particle) |
| Silimanite Powder | Corve Echo : Selladeora S |
| Perlite Powder | Tomo Ever Lite |
| Metakaoline Powder | Nissei Kyoeki K. K. |
| Titanium Oxide Powder | Furukawa Kikai Kinzoku K. K.: FR-41 (rutile type) |
| Water Repellant Preparation | methyl sodium siliconate/Shinetsu Kagaku Kogyo K. K.: POLON-C |
| Adhesion Property Providing Agent | Hydroxypropylene cellulose/Shinetsu Kagaku Kogyo K. K. |

As preferred coating agent suitable for forming the undercoat layer may be coating agent which takes water soluble alkaline silicate as primary component, contains power state holmite series mineral and has less than 4 of a molar ratio of $SiO_2/M_2O$ (M is alkali metal) in a composition excluding holmite series mineral. Namely, the undercoat layer by the coating agent can be a heat-foaming coat film taking the water soluble alkaline silicate similarly to the upper coat film, it may have high affinity to the upper coat film. Furthermore, it has higher adhesion ability to the surface of the steel material upon foaming as having low molar ratio of $SiO_2/M_2O$ to serve as suitable intermediate adhesive layer. As the upper coat film in this case, the fire-proof coating material according to the present invention having particularly high molar ratio of $SiO_2/M_2O$, such as that greater than or equal to 5, superior heat insulation ability can be ensured on the side of the upper coat film.

It should be noted that, concerning the coating agent for formation of the undercoat layer having molar ratio of $SiO_2/M_2O$ less than 5, $SiO_2$ supplying component is not essential. However, it may be possible to contain small aggregate or filler having small $SiO_2$ supply amount. The undercoat layer and the upper coat film may have substantially equal thickness and a total thickness of the undercoat layer and the upper coat film bay be within a range of about 1 to 20 mm.

EXAMPLES

Figure 2:
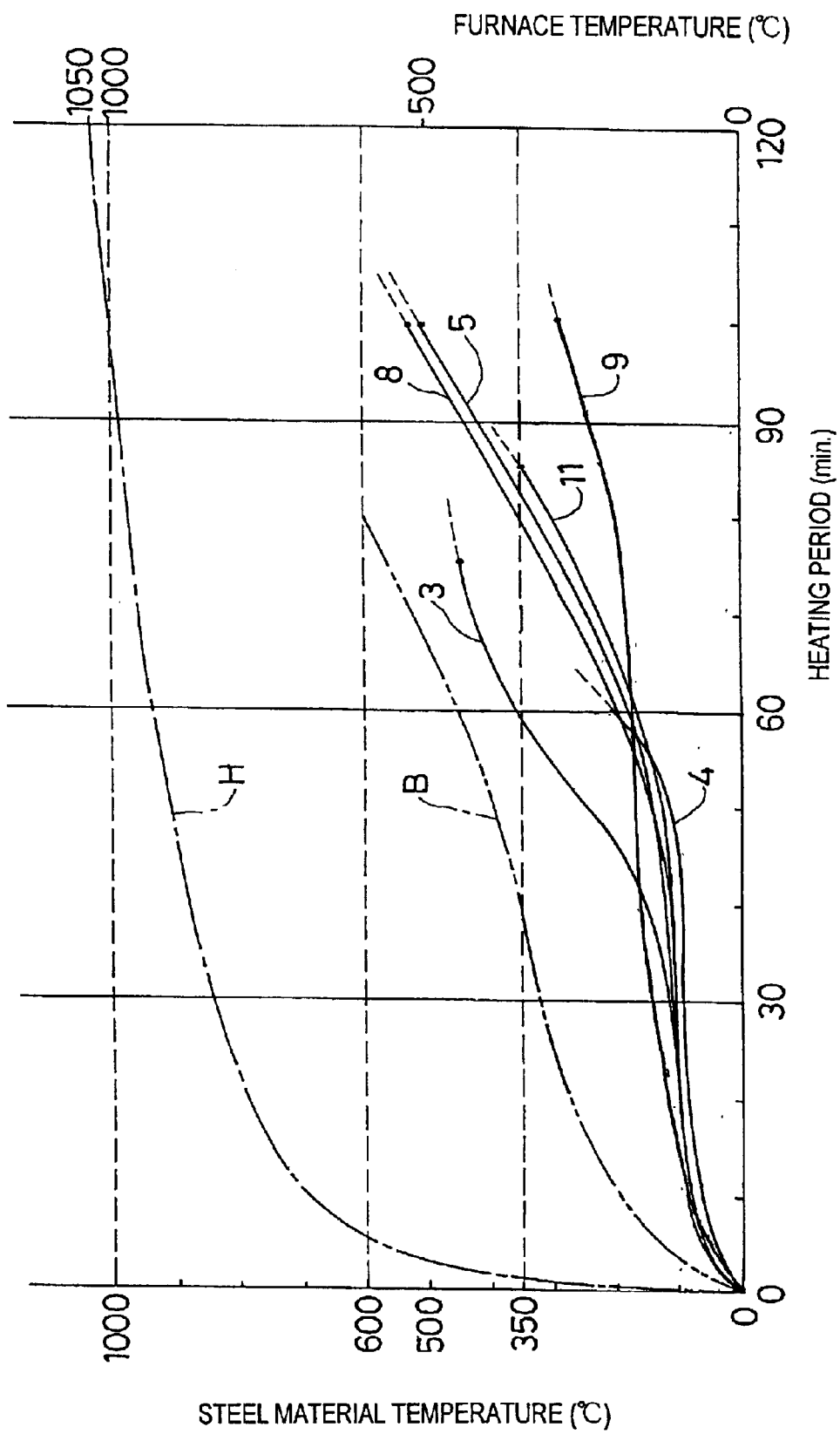
FIG. 2 is a characteristic chart showing a correlation of steel material temperature-heating period similar to FIG. 1.

The fire-proof coating materials Nos. 1 to 12 are prepared by mixing and stirring at blending ratio of respective components shown in the following tables 1 and 2. The fire-proof coating materials are applied on entire surface of H-section steel (refractory steel having section of 10 cm×10 cm) to form the coat film having about 10 mm of thickness by repeating spray painting-air drying for four times to prepare test samples. For the fire-proof coating material No. 12, about 5 mm undercoat layer is formed by applying the coating agent for undercoating twice, and about 5 mm upper coat film is formed by applying the No. 12 coat film twice to form coat film of two layer structure of about 10 mm Fire-Proof Performance Evaluation Test Concerning each test sample of H-section steel provided with coat films with coating materials Nos. 1 to 12, the test samples were placed with vertically orienting coat film forming surface within a test furnace, heated by direct fire (1400° C.) of gas burner, and temperatures at different six points of H-section steel were measured for 100 minutes at the longest from initiation of heating by means of a thermo couple, in accordance with Fire-Proof Performance Evaluation Test Method defined under JIS A1304, in General Building Research Corporation of Japan. Correlation curve of steel material temperature (average value of six points)— heating period in this test are shown in FIGS. 1 and 2. Figures put on the curves in the drawings are numbers of the coating materials shown in the tables 1 and 2. The curve of one dotted line H is a heating temperature curve (furnace temperature in the vicinity of the surface on the side of burner of the sample . . . measurement by thermo couple), the curve of two dotted line B is the correlation curve of steel material temperature-heating period (making reference to data on brochure of the makers) when existing conventional organic heat-foaming fire-proof paint. Distribution of test data to FIGS. 1 and 2 is nothing but avoiding complication of curves.

On the other hand, with respect to respective coat materials, storage stability, presence or absence of dripping upon application, adhesion strength and condition of coat film after fire-proof performance test were checked. The results are shown in the tables 1 and 2 together with a period (minutes) to reach the steel material temperature to 350° C. from initiation of heating in the fire-proof performance evaluation test. It should be noted that the storage stability is evaluated as "Good" when sedimentation of solid component, increasing of viscosity or hardening is not caused after stationary storage of the coating material over two months, and as "No Good" otherwise. Adhesion strength is evaluated as "No Good" when peeling off is easily caused at the interface between the coat film and steel when the coat film of the fire-proof coating material applied, dried and cured on the H-section steel by drill steel, as "Acceptable" when local interfacial peeling is caused by beating with large force, and as "Good" when no interfacial peeling is caused even by beating with large force.

TABLE 1

| Component (Wt Parts in Right Column) | Fire-Proof Coating Material No. | | | | | |
|---|---|---|---|---|---|---|
| | 1 | 2 | 3 | 4 | 5 | 6 |
| JIS No. 3 Water Glass | 89.3 | 86.2 | 81.3 | 83.4 | 56.0 | 72.0 |
| Sepiolite Powder | 8.9 | 5.8 | 3.5 | 7.3 | 5.5 | 7.0 |
| Calcium Silicate Powder | – | – | 8.1 | – | 5.0 | 6.0 |
| Colloidal Silica | – | – | – | – | 32.0 | 13.5 |
| Natural Glass Powder | – | 6.3 | – | 6.3 | – | – |
| Silimanite Powder | – | – | 5.5 | – | – | – |
| Almino Silicate Particle | – | – | – | 1.3 | – | – |
| Titanium Oxide Powder | 1.8 | 1.7 | 1.6 | 1.7 | 1.5 | 1.5 |
| MR | 3.22 | 3.74 | 3.88 | 3.86 | 6.16 | 4.51 |
| 350° C. Reaching Period (Min.) | 8 | 66 | 58 | 60↑ | 82 | 87 |
| Storage Stability | Good | Good | Good | Good | Good | Good |
| Dripping in Application | No | No | No | No | No | No |
| Adhesion Strength | Good | Good | Good | Good | AC | Good |
| Coat Film After Fire-Proof Performance Test | XX | X | X | X | o | – |

Wherein XX represents significant drip is caused;
X represents slight drip is caused;
– represents a little drip is caused;
o represents good;
and AC represents acceptable.

TABLE 2

| Component (Wt Parts in Right Column) | Fire-Proof Coating Material No. | | | | 11 | |
|---|---|---|---|---|---|---|
| | 7 | 8 | 9 | 10 | Upper | Lower |
| JIS No. 3 Water Glass | 54.9 | 56.7 | 62.5 | 64.8 | 89.5 | 50.0 |
| Sepiolite Powder | 3.4 | 3.6 | 2.0 | 2.3 | 7.7 | 4.4 |
| Calcium Silicate Powder | 22.9 | 18.8 | – | 2.7 | – | 4.6 |
| Colloidal Silica | 2.9 | 3.8 | 4.8 | 2.0 | – | 2.4 |
| Natural Glass Powder | – | – | – | 4.8 | – | 10.1 |
| Meta-Kaoline Powder | – | – | – | 2.8 | – | – |
| Vermiculite Powder | – | – | 14.9 | 9.5 | – | 0.7 |
| Perlite Powder | – | – | 6.0 | 4.8 | – | – |
| Almino Silicate Particle | – | – | – | – | – | 1.7 |
| Titanium Oxide Powder | 1.1 | 1.0 | 1.0 | 1.0 | 2.8 | 0.9 |
| Water Repellent Preparation | 3.1 | 3.2 | 2.4 | 2.8 | – | 5.1 |
| Adhesion Property Providing Agent | – | – | 0.1 | 0.1 | – | – |
| Water | 11.7 | 12.9 | 6.3 | 2.4 | – | 16.1 |
| MR | 5.89 | 5.55 | 5.63 | 5.58 | 3.22 | 5.80 |
| 350° C. Reaching Period (Min.) | 78 | 78 | 100↑ | 100↑ | 85 | |
| Storage Stability | Good | Good | Good | Good | Good | |
| Dripping in Application | No | No | No | No | No | |
| Adhesion Strength | AC | AC | Good | Good | Good | |
| Coat Film After Fire-Proof Performance Test | XXX | – | o | o | o | |

Wherein XXX represents slight crack is formed;
XX represents significant drip is caused;
X represents slight drip is caused;
– represents a little drip is caused;
o represents good;
and AC represents acceptable.

As shown in FIGS. 1 and 2 and tables 1 and 2, the fire-proof coating material (No. 2 to 11) of the present invention containing water soluble alkaline silicate, holmite series mineral and other $SiO_2$ supplying components except for the fire-proof coating material No. 3, requires over one hour until the temperature of H-section steel reaches 350° C. from initiation of heating, and can be seen that one hour fire-proof performance can be satisfactorily provided for the steel material formed of normal steel. It should be noted, that, in case of the fire-proof coating material No. 3, the period to reach the temperature of the coated steel material is slightly shorter than one hour but much superior to the fire-proof performance (curve B) by the conventional organic heat-foaming type fire-proof paint. Even with the fire-proof coating material No. 3, one hour fire-proof performance can be achieved by providing greater thickness for the coat film. However, in case of the coating material (No. 1) containing water soluble alkaline silicate and holmite series mineral but not containing other $SiO_2$ supplying component, only little fire-proofing effect can be obtained.

In case of the coating materials (Nos. 5, 7 to 10) which are set molar ratio of $SiO_2/M_2O$ greater than or equal to 5 by blending $SiO_2$ supplying component, more superior fire-proof performance can be provided with restricting dripping in the molten foaming condition so that two hour fire-proof performance may be provided for the steel material of normal steel by providing greater thickness of coat film. On the other hand, when a large amount of colloidal silica or calcium silicate is blended as $SiO_2$ supplying component (Nos. 5, 7, 8), adhesion strength of the coat film is slightly lower. When hydrolytic micas (such as non-calcined Vermiculite) is contained as the $SiO_2$ supplying component (Nos. 9 and 10) satisfactory adhesion strength can be attained and 350° C. reaching period of the coated steel material far beyond 100 minutes to be sufficient to provide two hours fire-proofing performance even with the coat film thickness of 10 mm. By providing the coat film of greater thickness or by employing refractory steel as the steel material, fire-proof performance in excess of three hours fire-proof can be expected. On the other hand, when the coat film is consisted with two layer structure to form the lower undercoat layer with the coating agent having lower molar ratio and the upper coat film with the coating material (No. 11) having higher molar ratio for the upper coat film, the lower undercoat layer serves for providing sufficient adhesion strength and the upper coat film can certainly provide superior fire-proof performance.

As set forth above, with the present invention, by employing inorganic fire-proof coating material, the inorganic coat film is transformed into the foamed layer by uniform foaming as subject to heat upon occurrence of fire disaster to exhibit quite superior heat insulation ability. Thus, softening of the coated steel by heat can be prevented for a long period to provide practical applicability as fire-proof coating for steel frame structure. This coating material can be produced at low cost and can easily form the coat film which is smooth to provide good external appearance. Furthermore, the coat film will never be peeled off by water cannon pressure for extinction upon fire disaster and may not generate harmful gas or smoke. On the other hand, the coat film after foaming can be easily peeled off by applying impulsive shock. Then, the peeled coat film can be disposed without causing environment contamination since it does not contain harmful substance.

Also, with the present invention, the fire-proof coating material is easy to obtain materials and can be produced at low cost.

Also with the present invention, the fire-proof coating material may certainly and smoothly cause foaming of the coat film upon fire disaster to form foamed layer with superior heat insulation ability, and in conjunction therewith can prevent formation of crack upon drying and curing of the coat film and due to secular change.

Furthermore, with the present invention, the fire-proof coating material may certainly provide superior fire-proofing performance for the steel material.

Furthermore, with the present invention, the fire-proof coating material may be provided high fluidizing point so as not to cause dripping of the foamed layer up to higher temperature, to provide superior fire-proof performance for the steel material.

Also, with the present invention, the fire-proof coating material capable of forming coat film, having superior heat-foaming ability can be easily prepared. The fire-proof coating material can enhance heat insulation ability by the foamed layer. On the other hand, by further blending titanium silicate powder, the coat film having mildew resistance and high whiteness can be provided. Also, by further blending hydroxypropylene cellulose, the coat film may have superior adhesion ability to the steel material to be coated under high temperature environment.

Furthermore, according to the present invention, by providing heat-foaming coat film on the steel frame with the fire-proof coating material, the fire-proof construction of steel frame work can be provided with superior fire-proofing performance withstanding against high temperature upon occurrence of fire disaster.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A fire-proof coating material comprising:
    a water soluble alkaline silicate having greater than or equal to 30 weight percent solid components excluding water;
    a holmite series mineral powder; and
    a $SiO_2$-supplying component other than the water soluble alkaline silicate and the holmite series mineral;
    wherein the molar ratio of $SiO_2$ to $M_2O$ in the coating material is from about 3.7 up to about 8, and M is alkali metal.

2. A fire-proof coating material as set forth in claim 1, wherein said holmite series mineral is sepiolite.

3. A fire-proof coating material as set forth in claim 1, wherein said holmite series mineral is from 5 to 50 Wt %.

4. A fire-proof coating material as set forth in claim 1, wherein the molar ratio of $SiO_2$ to $M_2O$ in the coating material is from about 5.0 up to about 7.

5. A fire-proof coating material as set forth in claim 1, wherein said $SiO_2$-supplying component is at least one selected from the group consisting of hydrolytic mica, calcium silicate, colloidal silica, natural glass, kaolines, and perlites.

6. A fire-proof coating material as set forth in claim 1, wherein said $SiO_2$-supplying component contains hydrolytic mica and at least one selected from the group consisting of calcium silicate, colloidal silica, natural glass, kaolines, and perlites.

7. A fire-proof coating material as set forth in claim 1, further comprising titanium oxide powder.

8. A fire-proof coating material as set forth in claim 1, further comprising hydroxypropylene cellulose.

9. A fire-proof construction formed with a fire-proof coating material defined in claim 1 on a surface of steel frame directly or via an undercoat layer.

* * * * *